United States Patent
Neiswander et al.

(10) Patent No.: US 10,739,912 B2
(45) Date of Patent: *Aug. 11, 2020

(54) ENHANCING TOUCH-SENSITIVE DEVICE PRECISION

(71) Applicant: Google LLC, Mountain View, CA (US)

(72) Inventors: Gregory Mason Neiswander, Sunnyvale, CA (US); Evan Malahy, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 87 days.

This patent is subject to a terminal disclaimer.

(21) Appl. No.: 15/982,674

(22) Filed: May 17, 2018

(65) Prior Publication Data

US 2018/0335890 A1 Nov. 22, 2018

Related U.S. Application Data

(63) Continuation of application No. 15/194,746, filed on Jun. 28, 2016, now Pat. No. 10,019,109.

(51) Int. Cl.
*G06F 3/041* (2006.01)
*G06F 3/0488* (2013.01)

(52) U.S. Cl.
CPC .......... *G06F 3/0418* (2013.01); *G06F 3/0414* (2013.01); *G06F 3/0488* (2013.01); *G06F 2203/04104* (2013.01); *G06F 2203/04808* (2013.01)

(58) Field of Classification Search
CPC ................................ G06F 3/041; G06F 3/0488
See application file for complete search history.

(56) References Cited

U.S. PATENT DOCUMENTS

| 7,561,146 B1 | 7/2009 | Hotelling |
| 10,019,109 B2 | 7/2018 | Neiswander et al. |
| 2010/0188328 A1* | 7/2010 | Dodge .................. G06F 3/0346 345/156 |
| 2012/0154294 A1 | 6/2012 | Hinckley et al. |

(Continued)

FOREIGN PATENT DOCUMENTS

| EP | 2450771 | 5/2012 |
| GB | 2502178 | 11/2013 |

(Continued)

OTHER PUBLICATIONS

Prosecution History from U.S. Appl. No. 15/194,746, dated Oct. 5, 2017 through Jun. 14, 2018, 55 pp.

(Continued)

*Primary Examiner* — Olga V Merkoulova
(74) *Attorney, Agent, or Firm* — Shumaker & Sieffert, P.A.

(57) ABSTRACT

Methods, systems, and apparatus for receiving data corresponding to a contact by a user detected at a touch-sensitive device. Variations in the contact over time are analyzed, and an anchor confidence score that is indicative of whether the contact represents a user input made using the touch-sensitive device is determined based at least on the analysis of the variations in the contact over time. The contact is classified as an anchor based at least on the anchor confidence score. Based on classifying the contact as an anchor, the contact is not processed as a user input to the touch-sensitive device.

20 Claims, 5 Drawing Sheets

(56) References Cited

U.S. PATENT DOCUMENTS

| | | | |
|---|---|---|---|
| 2012/0158629 A1* | 6/2012 | Hinckley | G06F 3/038 706/15 |
| 2012/0182238 A1 | 7/2012 | Lee | |
| 2012/0293420 A1 | 11/2012 | Stoumbos et al. | |
| 2013/0100043 A1 | 4/2013 | Kolbe | |
| 2013/0265269 A1 | 10/2013 | Sharma et al. | |
| 2013/0300696 A1 | 11/2013 | Haran et al. | |
| 2014/0298266 A1 | 10/2014 | Lapp | |
| 2014/0368436 A1 | 12/2014 | Abzarian et al. | |
| 2015/0185886 A1 | 7/2015 | Truong | |
| 2016/0077650 A1* | 3/2016 | Durojaiye | G06F 3/041 345/173 |
| 2016/0132291 A1* | 5/2016 | Bai | G06F 40/40 715/728 |
| 2016/0132568 A1* | 5/2016 | Vogel | G06F 3/0484 707/728 |
| 2017/0277353 A1* | 9/2017 | Mueller | B60K 37/06 |
| 2017/0277355 A1* | 9/2017 | Kang | G06F 3/0416 |
| 2018/0329677 A1* | 11/2018 | Gruber | G06F 3/0488 |

FOREIGN PATENT DOCUMENTS

| | | |
|---|---|---|
| WO | 2013/071198 | 5/2013 |
| WO | 2015/160752 | 10/2015 |
| WO | 2016/040715 | 3/2016 |
| WO | 2016/040718 | 3/2016 |

OTHER PUBLICATIONS

Response to Search and Examination Report dated Aug. 7, 2018, from counterpart British application No. GB1620791.2, filed Jan. 3, 2019, 12 pp.

Search and Examination Report in British Application No. GB1620791.2, dated Aug. 7, 2018, 13 pages.

Combined Search and Examination Report in British Application No. BG1620791.2, dated May 15, 2017, 12 pages.

Examination Report under Section 18(3) from counterpart GB Application No. GB1620791.2 dated Dec. 11, 2019, 3 pgs.

Response to Examination Report from counterpart GB Application No. 1620791.2 dated Dec. 11, 2019, filed Feb. 5, 2020, 21 pgs.

* cited by examiner

ENHANCING TOUCH-SENSITIVE DEVICE PRECISION

CROSS-REFERENCE TO RELATED APPLICATION

This application is a continuation application of U.S. application Ser. No. 15/194,746, filed Jun. 28, 2016, now allowed, which is incorporated by reference in its entirety.

TECHNICAL FIELD

This specification relates to touch-sensitive devices, and specifically to enhancing the precision of user input detection by touch-sensitive devices.

BACKGROUND

Touch-sensitive devices, such as touchscreens, trackpads, and the like, allow users to provide user inputs by contacting a surface of the touch-sensitive device using a stylus, finger, or other body part or instrument. The touch-sensitive devices are typically a component of a larger computing system capable of presenting content or other information at a display or other user interface, such that user inputs at the touch-sensitive device are processed to correspond to specific coordinates or areas of the display or interface. In some instances, touch-sensitive devices enable users to provide multiple inputs simultaneously, and the touch-sensitive device may process the multiple simultaneous inputs.

SUMMARY

When using a touch-sensitive device, such as a touchscreen or trackpad, a user may attempt to improve the accuracy of user inputs with an "anchor," or contact made by steadying their hand as they provide input to the touch-sensitive device. The user may create such an anchor to steady their hand by resting a portion of their hand or wrist on a portion of an input area of a touch-sensitive device while providing an intended user input using a finger, stylus, or other instrument, to increase the user's ability to accurately provide the user input at the touch-sensitive device. For example, a user of a tablet computer having a touchscreen may create an anchor by resting their middle and ring fingers on the touchscreen while providing an intended user input using their index finger. However, in some instances the anchor may be incorrectly interpreted as a user input at the touch-sensitive device, thereby frustrating the user's efforts to control a computing system using the touch-sensitive device.

The prevalence of anchor usage is particularly high for touch-sensitive devices in vehicles. For example, when a touchscreen is mounted in the dashboard of vehicle, a user may need to extend his arm a significant distance to reach the touchscreen, and greater extension leads to decreased touch precision. In addition, the movement of a vehicle adds to the difficulty of making precise user inputs. As a result, when using touch-sensitive devices in vehicles, users often intentionally or inadvertently make anchor contacts that are not intended to be user inputs to the computing system.

The present disclosure addresses this problem by providing methods and systems for classifying detected contacts at touch-sensitive devices as anchors, to distinguish such contacts from other contacts intended as user inputs to control a computer system. For example, a contact at a touch-sensitive device that is determined to have a shape typical of an anchor, e.g., a contact with a shape typical of a side of a user's hand, may be classified as an anchor and therefore may not be processed as a user input intended to control a computer system associated with the touch-sensitive device. Other factors or characteristics may also be considered when processing contacts with a touch-sensitive device to identify anchors. For example, a duration, size, or location of a contact, either individually or relative to other contacts, may be evaluated to determine whether the contact is an anchor. In some implementations, contact data may be processed in combination with sensor data, such as accelerometer or pressure sensor data, when determining whether to classify a particular contact as an anchor.

Innovative aspects of the subject matter described in this specification may be embodied in methods that include the actions of receiving, by one or more computing devices, data corresponding to a contact by a user detected at a touch-sensitive device, analyzing, by the one or more computing devices, variations in the contact over time, determining, by the one or more computing devices, an anchor confidence score indicative of whether the contact represents a user input made using the touch-sensitive device, the anchor confidence score being determined based at least on the analysis of the variations in the contact over time, classifying, by the one or more computing devices, the contact as an anchor based at least on the anchor confidence score, and based on classifying the contact as an anchor, not processing, by the one or more computing devices, the contact as a user input to the touch-sensitive device.

These and other embodiments may each optionally include one or more of the following features. In various examples, determining the anchor confidence score is based on analyzing the shape of the contact; analyzing the variations in the contact over time comprises analyzing a change in pressure of the contact over time; analyzing the change in pressure of the contact over time comprises: receiving movement data from one or more movement sensors, the one or more movement sensors detecting movement of the touch sensitive device over time, and analyzing the change in pressure of the contact over time based at least on the movement data.

In various other examples, the touch-sensitive device is installed in a vehicle and the one or more movement sensors are configured to detect movement of the vehicle, wherein receiving the movement data comprises receiving movement data from the one or more movement sensors that indicates movement of the vehicle over time, and wherein analyzing the change in pressure of the contact over time based at least on the movement data comprises analyzing a change in pressure of the contact by the user at the touch-sensitive device installed in the vehicle based at least on the movement of the vehicle over time; analyzing the change in pressure of the contact over time comprises: receiving data corresponding to a second contact by the user of the touch-sensitive device, determining a change in pressure of the second contact over time, and comparing the change in pressure of the contact relative to the change in pressure of the second contact over time.

In various other examples, analyzing the variations in the contact over time comprises: determining a movement of the contact during a period of time, receiving movement data from one or more movement sensors, the one or more movement sensors detecting movement of the touch-sensitive device during the period of time, and comparing the movement of the contact during the period of time with the movement data indicating movement of the touch-sensitive device over during the period of time; analyzing the variations in the contact over time comprises determining that a location of the contact at the touch-sensitive device does not correspond to any of one or more locations of user-selectable content displayed at the touch-sensitive device or corresponds to two or more locations of user-selectable content displayed at the touch-sensitive device, and wherein determining the anchor confidence score based at least on the analysis of the variations in the contact over time comprises determining the anchor confidence score based at least on the determination that the location of the contact at the touch-sensitive device does not correspond to any of the one or more locations of user-selectable content displayed at the touch-sensitive device or corresponds to two or more locations of user-selectable content displayed at the touch-sensitive device.

In various other examples, the features may optionally include receiving data corresponding to a second contact by the user at the touch-sensitive device, the second contact occurring while the contact is present on the touch-sensitive device, computing a distance between a location of the contact at the touch-sensitive device and a location of the contact at the second touch-sensitive device, and comparing the computed distance between the location of the contact at the touch-sensitive device and the location of the contact at the second touch-sensitive device to a threshold distance, wherein determining the anchor confidence score is further based on comparing the computed distance between the location of the contact at the touch-sensitive device and the location of the contact at the second touch-sensitive device to the threshold distance.

In various other examples, the features may optionally include receiving data corresponding to a second contact by the user at the touch-sensitive device, the second contact occurring while the contact is present on the touch-sensitive device, and determining a relationship between a location of the second contact at the touch-sensitive device and a location of the contact at the touch-sensitive device, wherein determining the anchor confidence score is further based on the relationship between a location of the second contact at the touch-sensitive device relative and the location of the contact at the touch-sensitive device.

In various other examples, the features may optionally include after classifying the contact as an anchor, monitoring, by the one or more computing devices, one or more user interactions with a computing system associated with the touch-sensitive device, adjusting, by the one or more computing devices, one or more factors used in generating anchor confidence scores based at least on the one or more user interactions with the computing system associated with the touch-sensitive device, and generating, by the one or more computing devices and using the adjusted one or more factors, a second anchor confidence score indicative of whether a second contact at the touch-sensitive device represents a user input made using the touch-sensitive device.

In various other examples, the features may optionally include receiving data corresponding to a second contact by the user at the touch-sensitive device, the second contact occurring while the contact is present on the touch-sensitive device, and determining a duration of the second contact, wherein determining the anchor confidence score is further based on the duration of the second contact; the features may optionally include determining sizes of one or more content items displayed at the touch sensitive device, determining a size of the contact, and comparing the size of the contact with the sizes of the one or more content items displayed at the touch sensitive device, wherein determining the anchor confidence score is further based on comparing the size of the contact to the sizes of the one or more content items displayed at the touch sensitive device.

In various other examples, the features may optionally include receiving, by the one or more computing devices, data corresponding to a user input by a user at an input device that is different from the touch-sensitive device, wherein determining the anchor confidence score based at least on the analysis of the variations in the contact over time comprises determining the anchor confidence score based at least on receiving the data corresponding to the user input at the input device that is different from the touch-sensitive device.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Figure 1:
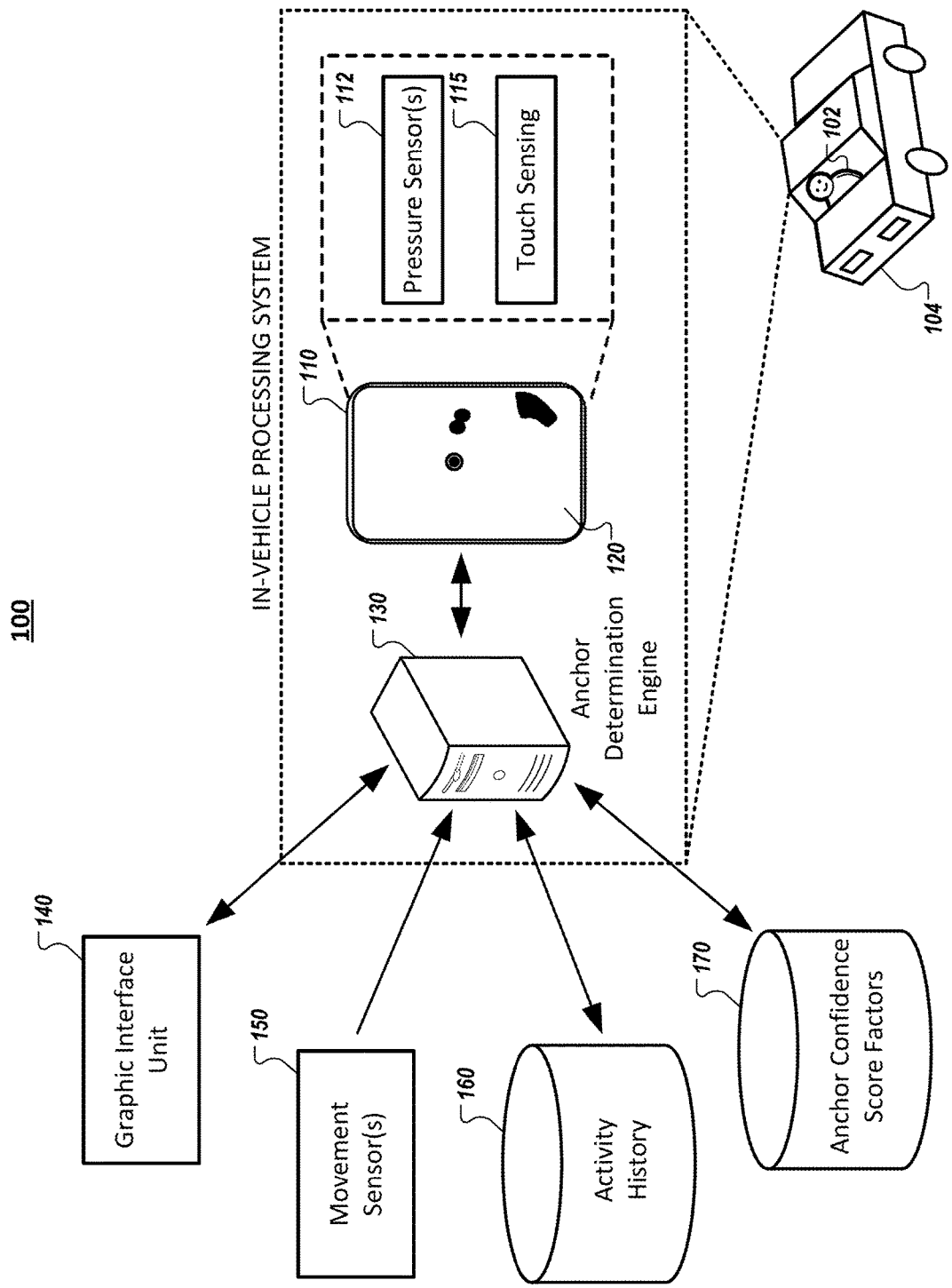
FIG. 1 depicts a system for detecting anchoring at a touch-sensitive device.

According to the present invention, various contacts detected at a touch-sensitive device are processed and classified. Some contacts are classified as anchors, which are distinguishable from contacts that are most likely provided as user inputs. For example, a user having a computing system that features a touch-sensitive device may contact an input area of the touch-sensitive device. The contact may be detected and processed to determine whether the contact should be classified as an anchor or as a user input intended to control the computing system. If the contact is classified as an anchor, the contact will not be processed as a user input for controlling the computing system. Otherwise, the contact may be classified as a user input and processed as an input for controlling the computing system. In processing the contact to classify it as either an anchor or user input, information relating to characteristics of the contact, variations of the contact over time, other contacts by the user at the touch-sensitive device, data received from other sensors associated with the computing system, and use activity or history data may be considered. The techniques discussed herein can significantly increase the accuracy of the determination of whether a contact represents an anchor or an intended user input. This in turn improves the responsiveness of the computing system, allowing it to better filter out and not respond to anchors and other extraneous contacts, while responding to legitimate inputs. Classifying a contact as an anchor, e.g., such that it is not processed as a user input, enables users to increase the precision of intended user inputs, which is especially useful when the user must reach to interact with the touch-sensitive device, or where the input area of the touch-sensitive device is too large to allow users to anchor on a surface outside of the touch input area.

For instance, a vehicle, such as a car, may include a touch-sensitive display that a driver or passenger of the vehicle may interact with to control one or more vehicle systems, such as a stereo system, heating, ventilation, and air conditioning (HVAC) system, navigation system, media player system, or other systems. Such touch-sensitive displays are often integrated into a dash or seat back of the vehicle. Due to the distance between the driver or passenger and the input area of the dash or seatback-mounted touch-sensitive display, it may be difficult for a driver or passenger to provide a precise input at the input area, because the user must reach out using the entire length of their arm to contact the input area. To deal with this issue, drivers or passengers may attempt to improve the precision of their intended user inputs by anchoring a portion of their hand or wrist at another point of the input area of the touch-sensitive display. Thus, when contacts are detected at an input area of a touch-sensitive display, data indicating these contact is processed to classify the contacts as intended user inputs or as anchors meant only to steady the driver's or passenger's hand as they provide intended user inputs. This processing may improve the precision of a user's interaction with the touch-sensitive display, by avoiding the interpretation of anchor contacts as intended user inputs, or vice versa. In making this determination, a computing system associated with the touch-sensitive display installed in the vehicle may consider various information relating to contacts detected at the input area of the touch-sensitive display, as well as other information.

FIG. 1 depicts an example computing system 100 for detecting when a user 102 is anchoring at a touch-sensitive device. In general, the computing system 100 is capable of detecting contacts at a touch-sensitive device 110 of the computing system 100, and determining whether to process each contact as a user input for controlling the computing system 100, i.e., an input that a user likely intended to control one or more actions performed by the computing system 100, or as an anchor that should be ignored, i.e., not treated as a user input for controlling the computing system 100. In some implementations, as shown in FIG. 1, the computing system 100 may be associated with a vehicle 104, such as a car, and components of the computing system 100 may be a part of an in-vehicle processing system.

Briefly, the computing system 100 features a touch-sensitive device 110 that includes an input area 120 that a user 102 contacts to interact with the computing system 100. To process information corresponding to a contact with the input area 120 by the user 102, the computing system 100 may also include a graphic interface unit 140 that controls the presentation of information to the user 102 in a graphical user interface (GUI). One or more movement sensors 150 provide information indicating movement of the computing system 100 that includes the touch-sensitive device 110. These sensors 150 may be sensors integrated into the vehicle 104, or may be separate sensors provided as part of the in-vehicle processing system. In some instances, the sensors 150 include sensors of one or more devices, such as a phone, watch, or other user device located in the vehicle 104. To determine whether a particular contact with the input area 120 by a user constitutes an anchor, the computing system 100 may also obtain information from an activity history 160 indicating past interactions of users with the touch-sensitive device 110, as well as anchor confidence score factors 170 that are used by the computing system 100 in determining whether to classify the particular contact as an anchor or as a user input for controlling the computing system 100. Processing by the computing system 100 to determine whether to classify the particular contact as an anchor or as a user input may be performed by an anchor determination engine 130 of the computing system 100.

In some implementations, the computing system 100 may be any of a vehicle computing system, mobile phone, smartphone, personal digital assistant (PDA), music player, e-book reader, tablet computer, laptop computer, or other stationary or portable device that has an integrated touch-sensitive device 110, such as a touchscreen or trackpad. In other examples, the computing system 100 may be a desktop computer, a computer integrated within an automobile or other vehicle, a computer integrated with a machine or other equipment, a cloud-based or other server computer system, or another computer that is equipped with an external or remote touch-sensitive device 110. In some implementations, one or more components of the computing system 100 may be located remotely from their associated hardware devices. For example, some of the components of the computing system 100 may be included in a vehicle computing system or smartphone, while other components are remote from the vehicle computing system or smartphone but accessible by the vehicle computing system or smartphone over one or more network connections.

For example, as shown in FIG. 1, at least the touch-sensitive device 110 and anchor determination engine 130 are components of an in-vehicle processing system installed in a vehicle for controlling one or more systems of a vehicle, such as in-vehicle stereo, HVAC, navigation, or other systems. The user 102, such as a driver or passenger of the vehicle, may interact with the touch-sensitive device 110, such as a dash-mounted multi-touch display, to control one or more of these systems using the in-vehicle processing system. The in-vehicle processing system may include one or more of the graphic interface unit 140, movement sensors 150, activity history 160, or anchor confidence score factors 170, or may communicate with one or more of these components over a wired or wireless data connection, such as a network.

In some implementations, the touch-sensitive device 110 may be a touchscreen, trackpad, multi-touch display, or other touch-sensitive device that includes an input area 120 configured for detecting contacts with the input area 120. The touch-sensitive device 110 may be integrated into or a separate component from other components of the computing system 100, and may communicate with other components of the computing system 100 over one or more wired or wireless connections, including over one or more network connections.

In other examples, the touch-sensitive device 110 may be separate from, but configured to communicate with, the computing system 100. In such an instance, the touch-sensitive device 110 may be communicatively coupled with the other components of the computing system 100 over one or more wired or wireless connections to enable contacts at the touch-sensitive device 110 to be processed and identified as anchors or as user inputs for controlling the computing system 100.

The touch-sensitive device 110 includes components configured to enable the touch-sensitive device to detect contacts at the input area 120 of the touch-sensitive device 110. For example, the touch-sensitive device 110 may feature a resistive panel, surface acoustic wave (SAW) sensor panel, capacitive panel, projected capacitance panel, e.g., using projective capacitive touch (PCT) technology in a mutual or self-capacitance panel, infrared grid, infrared acrylic projection panel, optical imaging panel, dispersive signal technology, e.g., using a piezoelectric panel, or acoustic pulse recognition panel. The touch-sensitive device 110 may be configured such that contact of a user's body, such as a finger or other body part, is detectable at the input area 120 of the touch-sensitive device 110. Additionally or alternatively, the touch-sensitive device 110 may be configured to detect contacts by a stylus or other instrument at the input area 120 of the touch-sensitive device.

Contacts at the touch-sensitive device 110 may be detected by a touch-sensing component 115 integrated into the touch-sensitive device. For example, the touch-sensing component 115 may include circuitry, processors, and controllers for detecting the positions of one or more contacts within the input area 120 of the touch-sensitive device 110.

In some implementations, the touch-sensitive device 110 may feature one or more additional sensing mechanisms for detecting contacts or characteristics of contacts within the input area 120 of the touch-sensitive device 110. For example, as shown in FIG. 1, the touch-sensitive device 110 may include one or more pressure sensors 112 for detecting a pressure of a contact detected within the input area 120 of the touch-sensitive device 110. In some instances, the one or more pressure sensors 112 may be separate from the touch-sensing component 115 of the touch-sensitive device 110. For example, a touch-sensitive device 110 may utilize resistive, capacitive, or other technologies (e.g., quantum switching techniques) for detecting the pressure of contacts at the touch-sensitive device 112.

In other implementations, the touch-sensing component 115 may also provide capability for and be configured for performing the functions of the one or more pressure sensors 112. For example, circuitry used in a resistive touchscreen may be adapted to perform pressure detection in addition to detecting the locations of contacts within the input area 120 of the touch-sensitive device. In other examples, pressure detection may be inferred based on characteristics of contacts with a touch-sensitive device 110. For example, a contact detected by the touch-sensing component 115 that increases in size over time may be processed as a contact that is increasing in pressure, since an increase in pressure of a user's contact using, e.g., a finger, would cause the finger to "flatten out" as it is more firmly pressed against the surface of the input area 120 of the touch-sensitive device 110.

The computing system 100 of FIG. 1 additionally includes a graphical interface unit 140 for configuring content to display to the user 102 of the computing system 100. For example, the computing system 100 may include a display and the graphical interface unit 140 may configure a GUI for presentation at the display of the computing system 100. In some instances, the display may be integrated with the touch-sensitive device 110, for example, where the touch-sensitive device 110 is a touchscreen. Additionally or alternatively, the display may be separate from the touch-sensitive device 110, such as where the computing system 100 is a laptop or desktop computer that features one or more monitors or other display screens. The graphical interface unit 140 may be capable of configuring a GUI for presentation at one or more displays, and of correlating user inputs to locations of a GUI presented at one or more displays.

In some instances, the GUI configured by the graphical interface unit 140 can include one or more content items, such as one or more user-selectable icons, images or videos, text, windows, etc. The graphical interface unit 140 can configure a GUI for presentation to a user, and can also reconfigure the GUI based on user inputs. For example, the graphical interface unit 140 may update a GUI presented to the user 102 based on user inputs provided to the computing system 100 that interact with elements presented in the GUI.

Additionally, the computing system 100 may utilize GUI information received from the graphical interface unit 140 in processing contacts detected at the touch-sensitive device 110 to determine whether particular contacts are to be classified and processed as user inputs, or are to be classified as anchors and therefore not processed as user inputs. For example, when a contact is detected at the touch-sensitive device 110, information specifying a GUI presented at the display of the computing system 100 may be obtained from the graphic interface unit 140. The contact may be processed in combination with the information specifying the GUI to determine if a location of the contact at the touch-sensitive device 110 corresponds to a location of a particular item of content, e.g., a user-selectable icon, presented at the display of the computing system 100. For example, the computing system 100 is more likely to process a contact at a location corresponding to a user-selectable icon as an intentional user input. In contrast, if the processing of the user input and GUI information indicates that the location of the user input does not correspond to a particular content item, the contact is more likely to be processed as an anchor.

The computing system 100 further includes one or more movement sensors 150, such as one or more accelerometers, motion sensors, gyroscopes or other sensors. In some examples, the one or more movement sensors 150 may be integrated with a device that includes the touch-sensitive device 110, or may be otherwise integrated into the computing system 100. For example, if the computing system 100 is associated with a vehicle, such as a car, airplane, boat, or other vehicle, the movement sensors 150 may be integrated with other components of the vehicle, e.g., a chassis of a car, and communicatively coupled to the anchor determination engine 130 over one or more wired or wireless connections. Movement information detected by the movement sensors 150 may be considered in the processing of contacts detected at the touch-sensitive device 110.

In some implementations, the computing system 100 may additionally include or have access to activity history data 160. The activity history data 160 may include information indicating operations performed at the computing system 100, user inputs received at the computing system 100, information indicating the classifications of contacts detected at the touch-screen device 110 as either anchors or user inputs, information indicating user activity or inputs received after the classification of contacts detected at the touch-sensitive device 110 as either anchors or user inputs, or other information relating to user interactions with the computing system 100.

In some implementations, the activity history data 160 may be stored locally at a device that includes the touch-sensitive device 110, e.g., in local storage of the in-vehicle processing system. In other implementations, the activity history data 160 may be stored externally from a device that includes the touch-sensitive device 110, and may be accessed over one or more wired or wireless connections. For example, the activity history data 160 may be remotely stored at a server, and the anchor determination engine 130 may access the activity history data 160 at the server over one or more wired or wireless networks.

In some implementations, the computing system 100 may further include or have access to data specifying one or more anchor confidence score factors 170, where the one or more anchor confidence score factors 170 are used in classifying contacts detected at the touch-sensitive device 110 as anchors, user inputs, or as other contacts, such as accidental contacts that should not be processed as either user inputs or anchors. In some implementations, the anchor confidence score factors 170 may be stored locally at a data storage component, e.g. a memory or hard drive, of a device that includes the touch-sensitive device 110. In other implementations, the activity history data 160 may be stored externally from a device that includes the touch-sensitive device 110 and may be accessed by the computing system 100 over one or more wired or wireless data connections. For example, the anchor confidence score factors 170 may be stored remotely at a server, and the anchor determination engine 130 may access data corresponding to the anchor confidence score factors 170 over one or more wired or wireless networks.

In some implementations, the anchor confidence score factors 170 may include any number of factors that may be used in computing an anchor confidence score. The computed anchor confidence score may then be used in classifying a contact detected at the touch-sensitive device 110 as an anchor. For example, as described with respect to FIG. 2, computation of the anchor confidence score for a particular contact detected at the input area 120 of the touch-sensitive device 110 may account for factors such as a detected shape, size, or duration of the contact. The anchor confidence score factors 170 may consider a detected pressure or change in pressure of the contact over time, i.e., a force applied to a surface of the input area 120 or change in force applied to the surface of the input area 120, or timing and/or a detected pressure of the contact relative to a detected pressure of one or more other contacts detected at the input area 120. The anchor confidence score factors 170 may include factors considering detected movement of the contact over time, or considering detected movement of the contact over time relative to the movement of one or more other contacts detected at the input area 120.

The anchor confidence score factors 170 may include factors considering detected movement of the contact in comparison to movement data obtained by one or more of the movement sensors 150, e.g., detected movement of the contact in comparison to detected movement of the computing system 100 that includes the touch-sensitive device 110. The anchor confidence score factors 170 may include factors considering a detected relationship of the positioning of a contact detected at the input area 120 and the positions of one or more content items, e.g., user-selectable icons, presented at a display of the computing system 100. The relationship between the detected contact and the displayed content may be determined based on information from the graphic interface unit 140 that specifies content displayed in a GUI. The anchor confidence score factors 170 may consider relationships between the positions of contacts detected at the input area 120 of the touch-sensitive device 110. The anchor confidence score factors 170 may consider a distance of a contact detected at the input area 120 to one or more other contacts detected at the input area 120 of the touch-sensitive device 110.

The anchor confidence score factors 170 may consider a size, such a computed area or dimensions, of the detected contact, relative to one or more user-selectable icons or other content items displayed at a display of the computing system 100. For example, the sizes of content items displayed in accordance with a GUI determined by the graphic interface unit 140 may be determined and compared to the size of a contact detected at the input area 120, since users may be likely to attempt to provide smaller inputs to select smaller icons. Additionally, since a smaller size of a content item displayed in a GUI may require a user attempting to interact with the content item to be more precise, the user may be more likely to use an anchor when interacting with a GUI that includes smaller content items. Moreover, in situations where multiple contacts are detected at the touch-sensitive device 110, larger contacts may be identified as anchors, while smaller contacts are more likely to be intended user inputs.

The anchor confidence score factors 170 may consider previous and subsequent contacts detected at the touch-sensitive device 110. For example, repetitive contacts in a same location of the input area 120 may suggest that the input should be processed as a user input and not classified as an anchor, while a user selection of a "back" or "cancel" option after processing a contact as a user input suggests that the contact was intended as an anchor.

The anchor confidence score factors 170 may further consider whether user inputs have been provided at other input devices associated with the computing system 100. For example, where the computing system 100 determines that the user 102 is providing user inputs at a keyboard concurrently with a contact at a touch-sensitive device 110, the computing system 100 may classify the contact with the touch-sensitive device 110 an anchor. Such a determination may be founded on the likelihood that the simultaneous contact at both the keyboard the touch-sensitive device 110 results from user 102 using the input area 120 of the touch-sensitive device 110 as an anchor for typing on the keyboard. Other factors may be considered and included in the anchor confidence score factors 170.

The anchor confidence score factors 170 may be adjusted based on the activity history data 160. That is, the anchor confidence score factors 170 may be adjusted, e.g., by the computing system 100 or another computing system, based on the interactions of the user 102 with the computing system 100. For example, if after classifying a detected contact with the touch-sensitive device 110 as an anchor, one or more subsequent contacts are detected in a proximate location of the input area 120, the computing system 100 may determine that the subsequent contacts are indicative of a user's intent to provide a user input at the location of the contact previously classified as an anchor. Based on the determination, one or more of the factors included in the anchor confidence score factors 170 may be updated, such that a subsequent similar contact would not be classified as an anchor.

The computing system 100 further includes an anchor determination engine 130 configured for receiving and processing data from the one or more other components of the computing system 100. For example, the anchor determination engine 130 may comprise one or more processors, memories, interfaces, or other components for obtaining and processing contacts detected at the touch-sensitive device 110.

The anchor determination engine 130 may be configured to receive data from the touch-sensitive device 110 indicating a contact detected at the touch-sensitive device 110. For example, based on the touch-sensitive device 110 detecting a contact at the input area 120, the anchor determination engine 130 may receive information relating to the contact from the touch-sensitive device 110. The anchor determination engine 130 may process the information relating to the detected contact to classify the detected contact as an anchor.

For example, the anchor determination engine 130 may access or otherwise obtain information from the graphic interface unit 140 indicating the locations, sizes, types, or other characteristics of content items presented in a user interface of the computing system 100. The anchor determination engine 130 may additionally or alternatively access or otherwise obtain data from one or more of the movement sensors 150 indicating movement of the computing system 100 and/or of the touch-sensitive device 110. In some instances, the anchor determination engine 130 may additionally or alternatively access or otherwise obtain activity history data 160 for the computing system 100.

Based on the received data relating to the detected contact, and optionally data from one or more of the graphic interface unit 140, one or more movement sensors 150, or activity history data 160, the anchor determination engine 130 may determine an anchor confidence score for the contact using one or more of the anchor confidence score factors 170. Based on the anchor confidence score generated for the contact, the anchor determination engine 130 may classify the contact as an anchor, and therefore may not process the contact as a user input for controlling the computing system 100. For instance, the anchor determination engine 130 may determine that the anchor confidence score satisfies a threshold anchor confidence score, and based on the determination may classify the contact as an anchor.

Alternatively, if the anchor confidence score does not satisfy the threshold, the anchor determination engine 130 may classify the contact as a user input and may therefore proceed to process the contact as a user input for controlling the computing system 100. In some implementations, the anchor determination engine 130 may also determine to classify the detected contact as another type of contact, for example, as a contact that should not be treated as either a contact or a user input, as the contact was likely an accidental contact made with the input area 120 by the user 102. For example, the anchor determination engine 130 may separately process the detected contact to determine whether to classify as a user input, e.g., by determining a user input confidence score for the detected contact and determining whether the user input confidence score satisfies a threshold. If the detected contact fails to satisfy either of the threshold scores for classification as an anchor or user input, the detected contact may be classified as an incidental contact.

While described herein as an anchor confidence score, in other implementations other metrics may be used in determining whether to classify a detected contact as an anchor or otherwise. For example, an anchor probability metric may be determined and used to classify a contact as an anchor, or a detected contact may be compared to one or more anchor templates and identified as an anchor based on sufficiently matching one or more of the anchor templates.

In some implementations, the anchor determination engine 130 continues to receive information relating to contacts detected at the touch-sensitive device 110 after classifying a particular contact as an anchor, user input, or otherwise, and may update a classification of the particular contact based on the subsequently received information. Thus, a contact that is not initially classified as an anchor may be reclassified as an anchor based on the anchor determination engine 130 receiving information after the initial classification relating to the contact or subsequently received contacts detected at the touch-sensitive device 110. For example, the anchor determination engine 130 may classify a contact as an accidental contact, and thereafter may reclassify the contact as an anchor if subsequently received information indicates that, while the contact is maintained with the input area 120 of the touch-sensitive device 110, a second "tap" contact is detected by the touch-sensitive device, which may be interpreted by the anchor determination engine 130 as a user input to the computing system 100.

In some implementations, information relating to detected contacts at the touch-sensitive device 110 after classification of a particular contact may be stored as activity history data 160 and/or may be used to update one or more of the anchor confidence factors 170. Such information may provide for a machine-learning process to improve the performance of the anchor determination engine 130 in classifying contacts detected at the touch-sensitive device 110 as anchors or otherwise.

FIGS. 2A to 2D depict example implementations for performing anchor detection. In some implementations, features of FIGS. 2A to 2D may be performed by the computing system 100 of FIG. 1. The features described with respect to FIGS. 2A to 2D may be combined with other features in determining whether to process a contact detected at a touch-sensitive device as an anchor, as a user input for controlling a computing system, or as another type of contact, such as an accidental contact that should not be processed as either an anchor or as a user input.

Figure 2A:
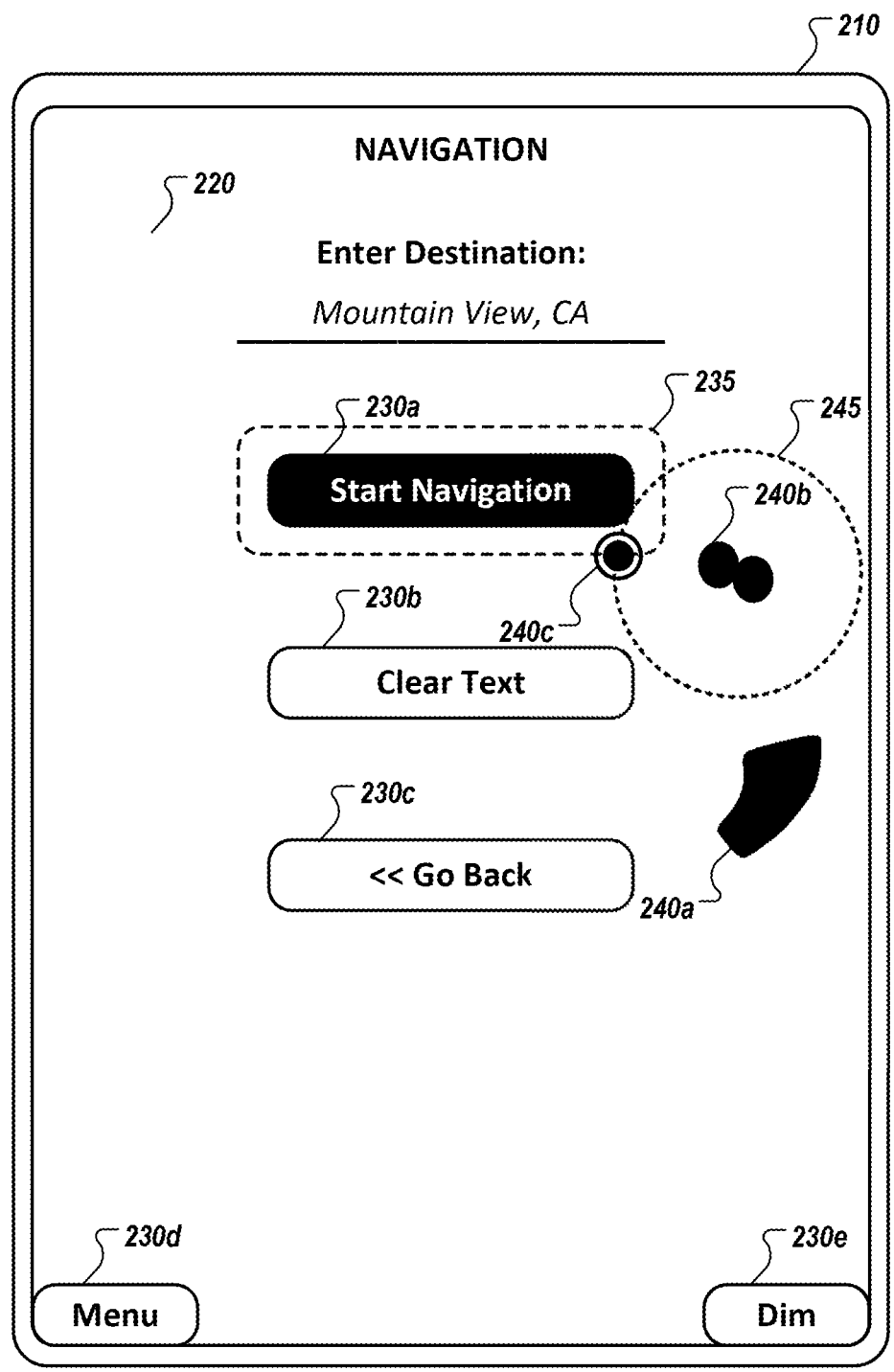
FIGS. 2A-2D depict examples for detecting anchoring at a touch-sensitive device using sensor data.

FIG. 2A depicts an example in which contacts detected within an input area 220 of a touch-sensitive device 210 may be processed and identified as anchors or as user inputs for controlling a computing system associated with the touch-sensitive device 210. For instance, the touch-sensitive device 210 may be installed in a vehicle, such as a car, as a part of an in-vehicle processing system that enables a driver or passenger of the vehicle to control various vehicle systems. In this example, the touch-sensitive device 210 may be a touchscreen or multi-touch display that incorporates both an input area 220 in which contacts by a user are detected by the touch-sensitive device 210 as well as a display for presenting a GUI to the user. As shown in FIG. 2A, the touch-sensitive device 210 displays information for controlling a navigation system of a vehicle. The GUI includes an area in which a user may enter a destination, and in this example shows that the user has already entered a destination of "Mountain View, Calif." Also displayed are content items in the form of user-selectable icons 230a-230e, whose selection will control the navigation system associated with the touch-sensitive device 210 to perform various operations. The user-selectable icons 230a-230e include a user-selectable icon 230a to "Start Navigation," a user-selectable icon 230b to "Clear Text," a user-selectable icon 230c to "Go Back," a user-selectable icon 230d to access a "Menu," and a user-selectable icon 230e to "Dim," i.e., turn off, the display of the touch-sensitive device 210.

At the time shown in FIG. 2A, a user, such as a driver or passenger of a vehicle that includes the touch-sensitive device 210, has performed three contacts 240a-240c within the input area 220 of the touch-sensitive device 210. The contacts 240a-240c include a contact 240a resembling an arc, which may be a contact with the input area 220 by a side of the user's hand, a contact 240b resembling a sideways "figure eight" shape, which may be a contact with the input area 220 by a middle and ring finger of the user, and a contact 240c resembling a circle, which may be a contact with the input area 220 by an index finger of the user. The touch-sensitive device 210 may detect the contacts 240a-240c, and the contacts 240a-240c may be processed by the touch-sensitive device 210 or another component of the computing system associated with the touch-sensitive device, similar to the anchor determination engine 130 of FIG. 1, to classify each of the contacts 240a-240c.

For example, the contact 240a may first be analyzed to determine whether the contact 240a should be processed as an anchor or as a user input to control the computing system associated with the touch-sensitive device 210. A shape of the contact 240a may be determined, and may be identified as being a shape more characteristic of a side of hand that is more often used as an anchor than as a user input. Additionally, a size of the contact 240a, such as a surface area of the contact 240a or dimensions of the contact 240a, may be determined, where an analysis of the size may suggest that the size of the contact 240a is substantially larger than a typical size of a user input. For example, the size of the contact 240a, e.g., its surface area or dimensions, may be compared to one or more thresholds, and based on the size of the contact 240a exceeding one or more of the thresholds, the contact 240a may be considered to be more likely an anchor than a contact intended as a user input. In some examples, the size of the contact 240a may be compared to the sizes of one or more displayed content items, e.g., user-selectable icons, where drastic differences in the size of the contact 240a and the displayed content items may suggest that the contact 240a is an anchor.

Additionally, a location of the contact 240a within the input area 220 of the touch-sensitive device 210 may be determined and may be compared with locations of the user-selectable icons 230a-230e. In some examples, each of the user-selectable icons 230a-230e may have an associated error region, such as the error region 235 surrounding the user-selectable icon 230a. Each error region indicates a region of the input area 220 that does not include a particular user-selectable icon, but in which a detected contact may nevertheless be classified as a user input selecting the particular user-selectable icon. As shown in FIG. 2A, the contact 240a appears outside of any such error regions for user-selectable icons, and such a determination may suggest that the contact 240a was not intended as a user input, but rather may be a contact that the user of the touch-sensitive device 210 is using as an anchor.

Other factors may also be considered in determining whether to classify the contact 240a as an anchor. For example, a duration of the contact 240a may be determined by analyzing variations in the contact 240a over time. If a duration of the contact 240a exceeds a threshold duration, e.g., a period of time that is typical for a "tap" intended as a user input, such a determination may suggest that the contact 240a is intended as an anchor and not as a user input for controlling a computing system associated with the touch-sensitive device 210. As described, other aspects of the contact 240a may be determined and processed to determine whether to classify the contact 240a as an anchor. Based on these aspects and, optionally, other sensor data, an anchor confidence score may be generated for the contact 240a, and based on the generated anchor confidence score, the contact 240a may be classified as an anchor.

The contact 240b may also be analyzed to classify the contact 240b as an anchor, user input, or otherwise. For example, similar to the contact 240a, a shape, size, location, and duration of the contact 240b may be analyzed in determining whether to classify the contact 240b as an anchor. Other characteristics of the contact 240b may also be analyzed in determining whether to classify the contact 240b as an anchor. For example, a distance and/or position of the contact 240b on the input area 220 of the touch-sensitive device 210 may be determined relative to the position of the contact 240a on the input area. Based on determining that the contact 240b is located above the contact 240a (e.g., if the touch-sensitive device 210 is sitting in an upright, substantially vertical position) and is located within a threshold distance of the contact 240a, the contact 240b may be identified as likely being made by the same hand as that which made the contact 240a. In some instances, such a determination may suggest that the contact 240b is more likely to be an intended user input.

However, as all factors relating to the contact 240b may be considered in generating an anchor confidence score for the contact 240b, the contact 240b may be classified as a second anchor by a user on the input area 220 of the touch-sensitive device 210. For example, because the contact 240b is not overtop of or within an error region, e.g., the error region 235, of a user-selectable icon 230a-230e, has a shape that is characteristic of an anchor, and has a duration longer than a typical "tap" user input, an anchor confidence score for the contact 240b may be generated such that the contact 240b is classified as a second anchor.

Contact 240c may also be processed by a computing system after its detection by the touch-sensitive device 210. In some implementations, many of the same factors considered with respect to contact 240a and contact 240b may also be analyzed for the contact 240c. For example, the contact 240c may be identified as having a size and shape that is typical of intended user inputs, e.g., inputs made using a stylus or a tip of a user's finger. A duration of the contact 240c may be determined based on analyzing variations in the contact 240c over time, and may result in a determination that the contact 240c is of a relatively brief duration typical of an intended "tap" user input. In FIG. 2A, this brief "tap" input is indicated by the concentric circle around the contract 240c.

Moreover, a location of the contact 240c may be determined and compared to the locations of the user-selectable icons 230a-230e and the other contacts 240a, 240b. For example, the location of the contact 240c may be compared to the locations of the user-selectable icons 230a-230e, and a determination made that the contact 240c does not overlap with any of the user-selectable icons 230a-230e. However, the location of the contact 240c may be compared to locations of error regions surrounding the user-selectable icons 230a-230e, such as the error region 235 corresponding to the user-selectable icon 230a, and may be determined to intersect the error region 235 of the user-selectable icon 230a. Such a determination may suggest that that contact 240c is more likely to be an intended user input, as it is generally less likely that users will choose to anchor their hands over top of or near user-selectable icons.

Additionally, the position of the contact 240c relative to the contacts 240a, 240b may be analyzed, and a determination made that the contact 240c is in a position that would be typical of an intended user input, i.e., in an expected position relative to anchors provided by a user's hand, i.e., contact 240a, and other fingers, i.e., contact 240b. In addition to the relationship between the position of the contact 240c and the positions of the other contacts 240a, 240b, a distance of contact 240c to each of the other contacts 240a, 240b may be determined. For example, distances between the contact 240c and the contacts 240a, 240b may be determined and compared to one or more thresholds. That the distance between the contact 240c and the contact 240b satisfies a threshold, e.g., the threshold 245 surrounding the contact 240b, may suggest that the contact 240c is intended as a user input, since users typically anchor using the same hand as they use to provide a user input, and will anchor near the area of the input area 220 where they are attempting to provide the user input.

These various factors may be considered and used to generate an anchor confidence score for the contact 240c. The contact 240c may then be classified based on the generated anchor confidence score. For example, the anchor confidence score for the contact 240c may not satisfy a threshold anchor confidence score and may therefore be processed by the computing system associated with the touch-sensitive device 210 as an input to select the "Start Navigation" user-selectable icon 230a displayed at the touch-sensitive device 210.

While the example of FIG. 2A describes a scenario in which a user is anchoring their hand while providing user input, such that all of the contacts 240a-240c were made using the same hand of the user, in some implementations, contacts can be identified as likely being made using the user's other hand and classified as an anchor based on that determination. For example, for some computing systems that feature touch-sensitive devices, such as tablet computers, a user may grip the computing system such that a portion of a thumb or other finger rests on the input area of the touch-sensitive device. While gripping the computing device in such a way, the user may then provide intended user inputs using their other hand. In such a scenario, the same factors considered in processing the contacts 240a-240c, or other factors, may be considered in determining whether to classify the contact corresponding to the user's grip of the computing device as an anchor. For instance, such a contact may be classified as an anchor based on determining that the contact has a shape similar to a user's flattened thumb, is located near an edge of the input area of the touch-sensitive device, has a duration longer than any other contact detected at the input area, is located far away from other contacts or user-selectable icons, is relatively still in its location on the touch-sensitive device, etc.

Figure 2B:
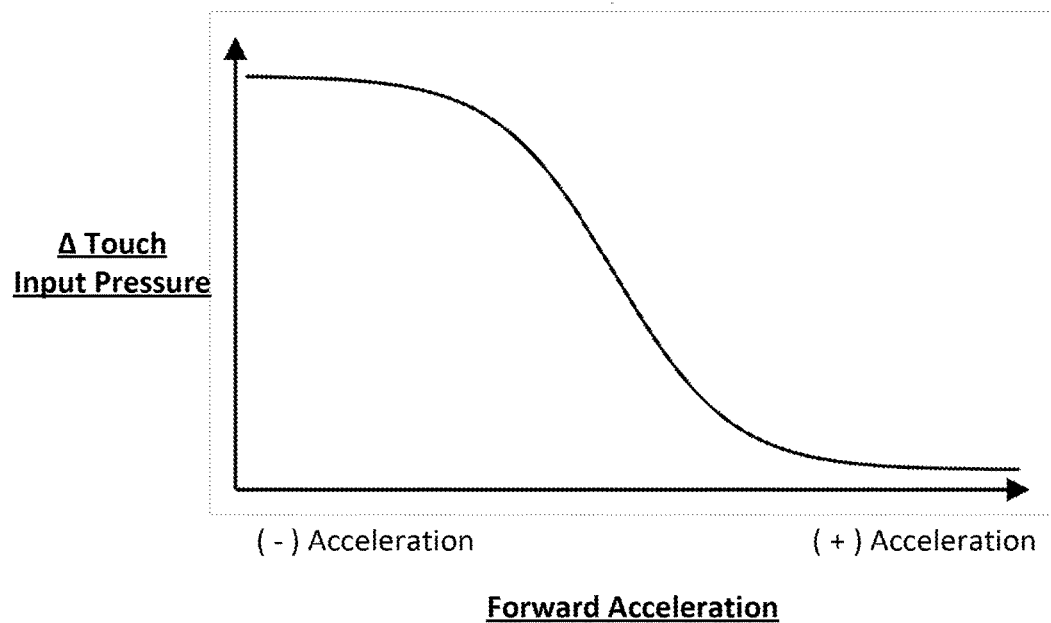

FIG. 2B illustrates an example in which sensor data obtained by one or more components of a computing system that includes a touch-sensitive device may be processed to identify whether a particular input should be processed as an anchor, as a user input, or as another type of contact with an input area of the touch-sensitive device. In the example shown in FIG. 2B, variations in pressure of a contact detected at an input area of a touch-sensitive device may be analyzed over time and compared with detected changes in acceleration of the touch-sensitive device over time. For example, a touch-sensitive device installed in a vehicle, such as a car, may be a multi-touch display that is capable of detecting a pressure of a contact at an input area of the touch-sensitive device. The input area of the touch-sensitive device may be positioned in an upright position, for example, where the touch-sensitive device is integrated into a dash of the vehicle. The computing device featuring the touch-sensitive device may also be associated with one or more movement sensors, such as an acceleration sensor that is configured to detect acceleration of the touch-sensitive device in the directions corresponding to the forward and reverse movements of the vehicle.

As shown in FIG. 2B, obtaining both contact pressure data and acceleration data may allow for a normalization of the pressure data to account for acceleration of the user and touch-sensitive device. FIG. 2B represents a characterization curve that may be used to normalize pressure data using acceleration data. The characterization curve shows the effects of acceleration on contact pressure. Generally, for a touch-sensitive display integrated into the dash of a car, a negative acceleration of the car results in an increase in the contact pressure detected by the touch-sensitive device. For instance, as a user attempts to provide a constant force to an input area of the touch-sensitive device, e.g., to anchor their hand to provide an input as the car is moving, the constant force may increase as the vehicle decelerates. In contrast, when the user is anchoring their hand on the input area and the vehicle accelerates, the detected pressure of the contact may decrease. When the vehicle is decelerating rapidly, the pressure sensor of the touch-sensitive device may be saturated, resulting in a maximum pressure output by the sensor. Similarly, when the vehicle is accelerating rapidly, a user's contact with the input area may be reduced to a very low pressure, or the user may even lose contact with the input area of the touch-sensitive device, thus resulting in a detected pressure that tends towards zero.

When a contact is detected at an input area of the touch-sensitive device, the characterization shown in FIG. 2B may be used in determining whether to process the contact as an anchor, user input, or otherwise. For example, a contact that is intended as a user input, e.g., an attempted "tap" by a user at an input area of the touch-sensitive device, may typically be characterized by a rapid spike in pressure at the location of the contact at the time of the "tap," followed by a rapid decline in pressure at the location of the contact when the user is completing the "tap." However, if, while the user is attempting to make the "tap" input, the vehicle including the user and touch-sensitive device is decelerating, the detected change in pressure at the touch-sensitive device may increase more rapidly or may have a greater pressure when compared to other "tap" inputs. A computing system may normalize the detected input pressure based on an analysis of the pressure and the forward acceleration information, and based on the normalization may determine to process the contact as a user input.

Similarly, a user anchoring their hand on the input area of the touch-sensitive device may typically do so using a relatively steady pressure. However, as the vehicle that includes the user and the touch-sensitive device accelerates or decelerates, the detected pressure of the anchor contact may vary considerably. For example, as the user is anchoring their hand on the input area of the touch-sensitive device, a rapid deceleration of the vehicle may result in a drastic increase of the pressure of the anchor, which the system may misinterpret as a user input. However, by processing the input pressure in conjunction with the acceleration information, the detected pressure of the contact may be normalized, such that the variations in pressure as the vehicle decelerates do not result in processing of the contact as a user input.

Figure 2C:
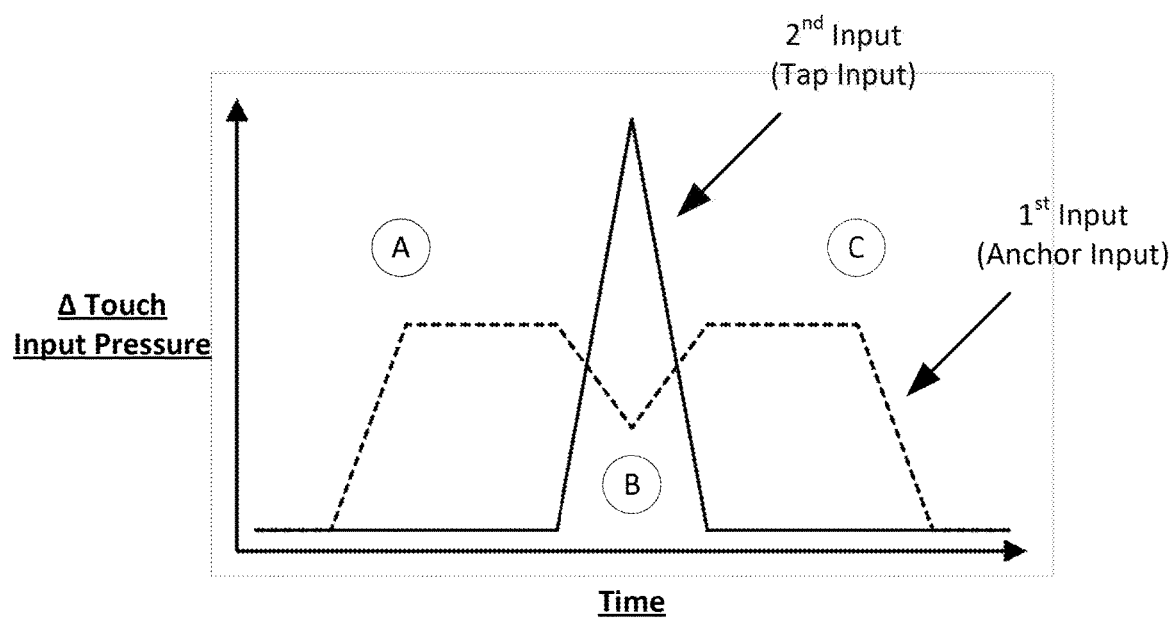

FIG. 2C depicts a second example in which sensor data is considered in combination with contact information to process contacts detected at a touch-sensitive device. Specifically, FIG. 2C is a graph showing the change in pressure over time for two contacts detected at a touch-sensitive device. Often, users may apply a fairly uniform pressure over time while they are using a particular contact as an anchor. When anchoring their hand to increase the precision of intended user inputs, a pressure of the applied anchor will often decrease when intended user inputs are provided. For example, a user resting a side of their hand on an input area of a touch-sensitive device to create an anchor may roll their hand slightly when providing a "tap" input for selecting a user-selectable icon. The rolling of their hand may result in a decrease in the applied pressure at the location of the anchor contact, and a corresponding increase in pressure at the location of the "tap" input. Processing of this pressure information may assist in the accurate classification of the anchor and "tap" inputs provided by the user.

FIG. 2C describes such an example. For instance, the graph of FIG. 2C may show pressure data for an event in which a driver or passenger of a vehicle is interacting with a touch-sensitive display to control an aspect of a computing system associated with the vehicle, e.g., to select a "Start Navigation" user-selectable icon at a multi-touch display installed in the dash of the vehicle. As the multi-touch display may be relatively far from the driver or passenger, thereby requiring the driver or passenger to reach forward to contact the multi-touch display, the driver or passenger may lose their ability to precisely provide inputs to the multi-touch display. Therefore, the driver or passenger may anchor their hand at the multi-touch display before selecting the "Start Navigation" user-selectable icon.

At time (A), a first increase in pressure is detected at the multi-touch display as the driver or passenger anchors their hand at the multi-touch display. The pressure of that contact increases and then remains relatively constant as the driver or passenger rests their hand on the multi-touch display. At time (B), the driver or passenger makes a second contact with multi-touch display to provide a user input. Thus, at time (B), a second contact at the multi-touch display is detected, which has a brief but substantial pressure. Simultaneously, since the driver or passenger must roll their hand to provide this "tap" input, a pressure of the anchor contact decreases. After the "tap" input has been provided, at time (C), the hand position of the driver or passenger may return to the previous anchoring position, and so the pressure of the anchor may return again to the pressure detected at time (A). Eventually, the driver or passenger releases stops anchoring their hand at the multi-touch display, causing the pressure of the first input to decrease to the initial value.

While FIG. 2C illustrates a single example in which the pressure of multiple detected contacts may be processed to identify an anchor and a user input, in the general, the computing system may process the pressures of multiple applied contacts to otherwise identify contacts as anchors or user inputs. For instance, the computing system may identify moments in time when an increase in pressure of a detected contact substantially coincides with a decrease in pressure of a second contact. If the contact decreasing in pressure was detected prior to the contact that is increasing in pressure, such a pattern may be used to identify the contact decreasing in pressure as an anchor and the contact increasing in pressure as an intended user input. In other examples, the pressures of the two contacts may be compared, and a contact having a more constant pressure over time may be classified as an anchor, while a contact having more variance in pressure over time may be classified as a user input. Other patterns of contact pressure may also be analyzed by the computing system to assist in the classification of contacts as anchors.

Figure 2D:
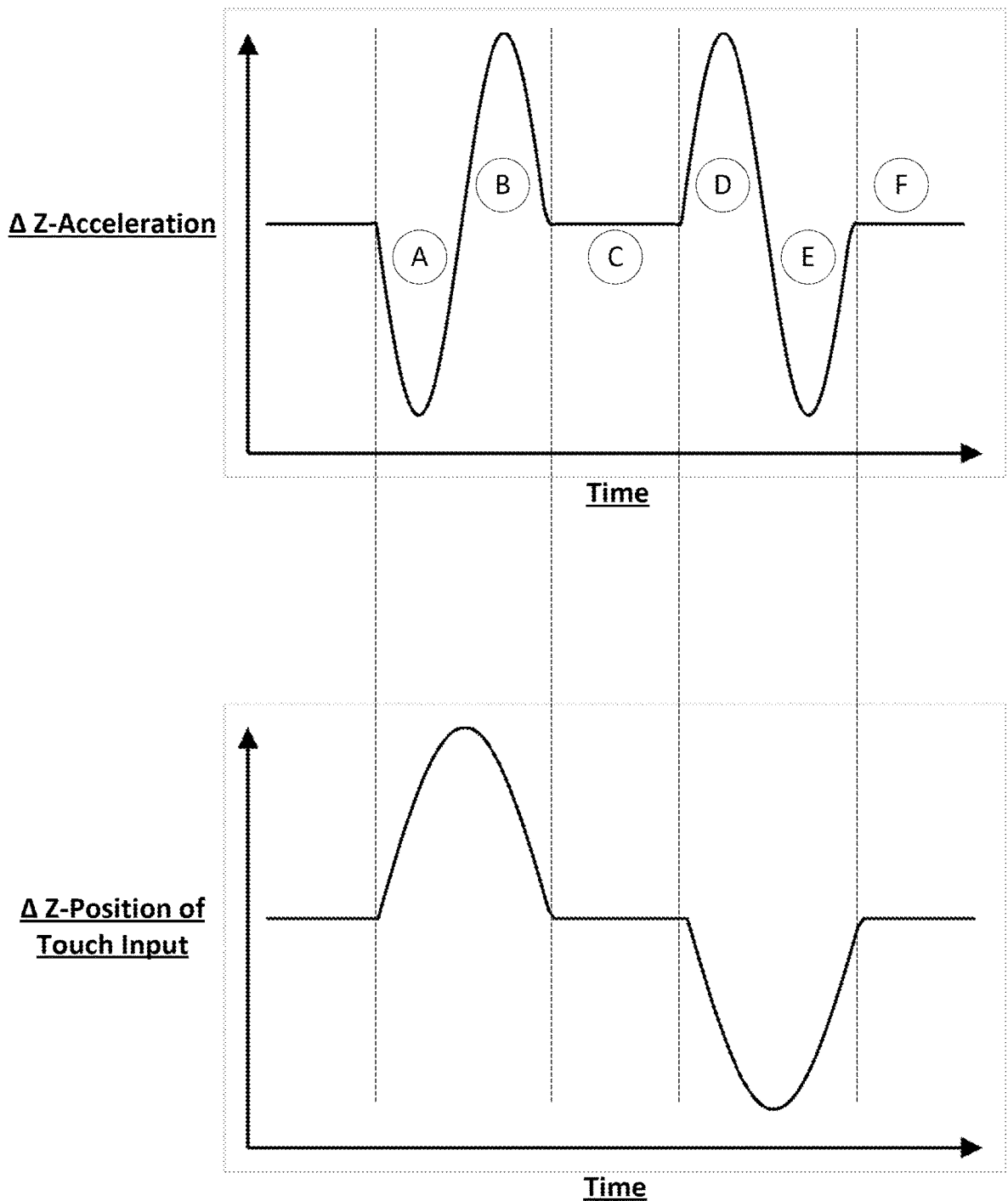

FIG. 2D depicts a third example implementation in which sensor data is used in processing a contact detected at a touch-sensitive device to determine whether to classify the contact as an anchor. In the example of FIG. 2D, movement data obtained by one or more movement sensors is processed in conjunction with data relating to a contact detected at the touch-sensitive device. Processing movement data may allow for the computing system to determine whether movement of a detected contact is intended, which would suggest that the contact may be intended as a user input, or whether the movement of the detected contact is unintended, thereby suggesting that the contact may be an anchor used to steady a user's hand.

For example, a vehicle that features a touch-sensitive display may also feature one or more movement sensors configured to detect movements of the vehicle. The one or more movement sensors can include one or more accelerometers configured to detect acceleration of in the z-direction, i.e., in the direction perpendicular to the ground. The one or more sensors may be used to detect acceleration of the vehicle in the z-direction over time. The top graph of FIG. 2D illustrates such movement detection for a particular event, such as the vehicle driving over a pothole or other depression in a road.

Due to the presence of suspension springs on the vehicle, the acceleration of the vehicle as it drives over the pothole may be plotted as shown in the top graph of FIG. 2D. For instance, as the vehicle drives over the pothole, causing the vehicle to move lower in the z-direction, the vehicle may quickly accelerate in the negative z-direction (time (A)) until the vehicle's suspension springs begin to compress and to stop the movement of the vehicle in the negative z-direction. Stopping the vehicle's movement in the negative z-direction is represented by the rapid transition to a positive acceleration in the z-direction (time (B)). This acceleration then returns to an approximate zero acceleration in the z-direction (time (C)) as the vehicle is driving through the depression in the road. As the vehicle exits the depression in the road, the acceleration of the vehicle may become positive z-direction (time (D)) for a brief period. Once out of the depression, the vehicle settles back to the level road surface via a negative acceleration in the z-direction (time (E)) before finally resting on the level road surface as at the time preceding the event (time (F)).

If a user, such as a driver or passenger of the vehicle, is contacting an input area of a touch-sensitive device during this event, for example, to steady their hand as the vehicle is moving while they attempt to provide other user inputs, the contact may be detected as a moving contact at the touch-sensitive device that is more characteristic of an intended user input than an anchor. However, by processing movement data of the contact in conjunction with the movement data from the one or more sensors, the movement of the contact may be normalized to account for the acceleration of the vehicle in the z-direction.

For example, as shown in the bottom figure of FIG. 2D, movement of the contact over time may be tracked in the z-direction, where the z-direction corresponds to the same z-direction discussed with respect to the movement data. Thus, when the touch-sensitive device is positioned upright in the vehicle, e.g., by being integrated into a dash of the vehicle, movements along the z-axis of the input area of the touch-sensitive device correspond to movements in the z-direction of the vehicle.

Therefore, for the same pothole event described above, the position of the detected contact would move upwards, i.e., in the positive z-direction, on the input area of the touch-sensitive device and then back to the original position while the vehicle is moving into the depression in the road (times (A) and (B)). The detected position of the contact would then move lower, i.e., in the negative z-direction, on the input area of the touch-sensitive device as the vehicle is moving out of the depression in the road (times (D) and (E)). Typically, such movement may be interpreted by a computing system associated with the touch-sensitive display as a moving input more characteristic of an intentional user input. However, by combining the contact movement information with the movement data obtained by the one or more movement sensors, the movement of the contact may be normalized such that the contact is processed as an anchor instead of as an intentional user input.

While discussed above primarily with respect to touch-sensitive devices installed in a vehicle, such as a car, similar techniques may also be implemented in other implementations. For example, similar techniques may be applied to mobile device or tablet computer applications, for example, to normalize detected contacts to account for effects on contact movement or pressure resulting from a user's walking.

Figure 3:
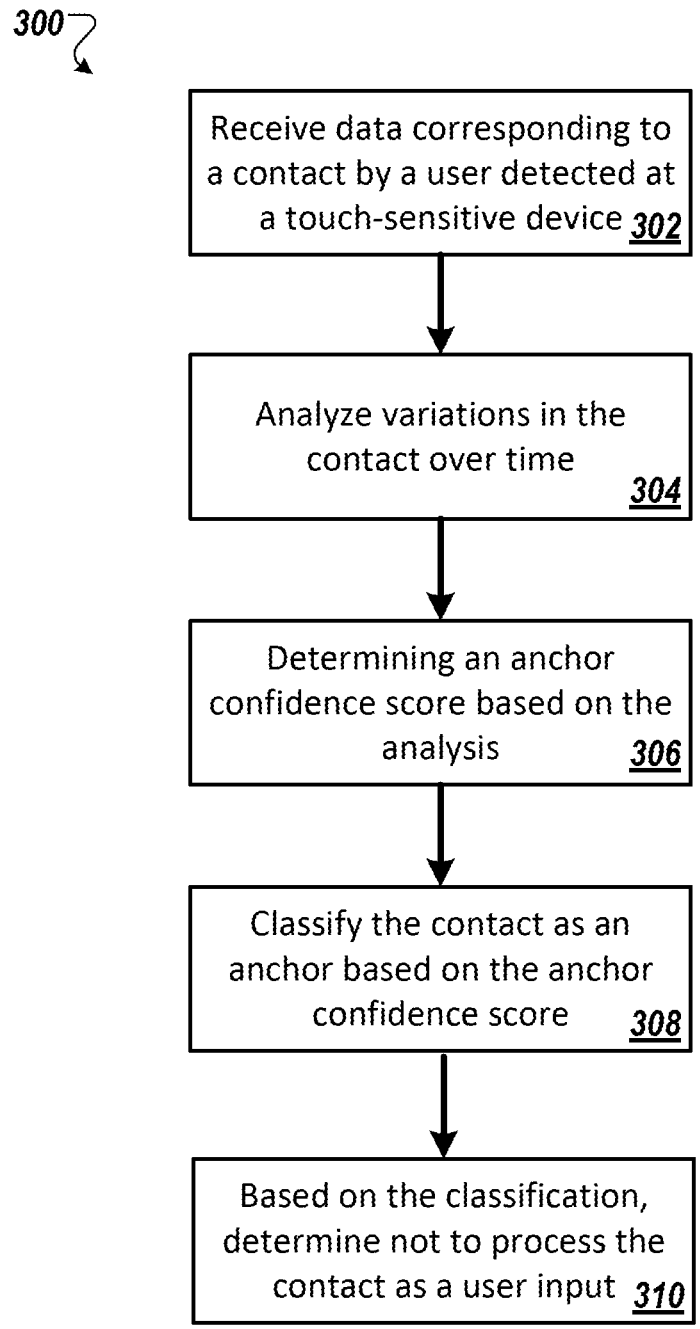
FIG. 3 is a flowchart of an example process for detecting anchoring at a touch-sensitive device.

FIG. 3 is a flowchart of an example process 300 for detecting anchoring at a touch-sensitive device. In some implementations, the example process 300 may be performed by the computing system 100 of FIG. 1. For example, the anchor determination engine 130 or another component of the computing system 100 may perform the operations of the process 300 to classify a detected contact at a touch-sensitive device 110 as an anchor.

Data is received that corresponds to a contact by a user detected at a touch-sensitive device (302). For example, the anchor determination engine 130 may receive data from the touch-sensitive device 110 corresponding to a contact detected at an input area 120 of the touch-sensitive device 110. In some implementations, receiving the data corresponding to the detected contact may comprise receiving data specifying one or more characteristics of the contact. For example, the data corresponding to the contact may specify a position of the contact on an input area 120 of the touch-sensitive device 110, may specify a size, e.g., area or dimensions, of the contact, may specify a pressure of the contact, may specify a shape of the contact, may specify a duration of the contact, or may specify other characteristics of the contact. For instance, based on detecting a contact at an input area 120 of the touch-sensitive device 110, the touch-sensitive device 110 may transmit data to the anchor detection device 130 that indicates such characteristics as a sideways "FIG. 8" shape of the contact typical of two fingers placed next to one another on the input area 120.

Variations in the contact over time are analyzed (304). For example, after receiving data corresponding to the contact detected by the touch-sensitive device 110, the anchor detection device 130 may analyze the received data, and may also analyze data received subsequently from the touch-sensitive device 110 that corresponds to the detected contact. For example, the anchor detection device 130 may analyze the received data to determine a shape, size, pressure, or location of the contact, or changes in a shape, size, pressure, or location of the contact over time. In some instances, analyzing variations in the contact over time may involve receiving data corresponding to a second contact or additional contacts by a user detected at the touch-sensitive device 110, and the anchor detection device 130 may analyze changes in the shape, size, pressure, or location of the contact relative to the second or other additional contacts by the user detected at the touch-sensitive device 110.

Additionally or alternatively, analyzing variations in the contact over time may comprise receiving information from other components of the computing system 100, and analyzing the data relating to the detected contact based at least on the received data. For instance, the anchor determination engine 130 may receive additional information from one or more of the graphic interface unit 140, movement sensors 150, or activity history 160, and may analyze the data corresponding to the contact by the user detected at the touch-sensitive device 110 based at least on the received additional information.

An anchor confidence score is determined based on the analysis (306). For example, the anchor determination engine 130 may access or obtain one or more of the anchor confidence score factors 170, and may compute an anchor confidence score for the detected contact using the anchor confidence score factors 170. For example, the anchor determination engine 130 may provide weights to information received from the touch-sensitive device 110, the graphic interface unit, the one or more movement sensors 150, and/or the activity history data 160 to generate an anchor confidence score for the detected contact. Various mechanisms may be used to generate the anchor confidence score. For example, a score may be assigned to each of the accessed anchor confidence score factors 170 or to different segments of information accessed or received by the anchor determination engine 130, and the scores may be averaged, summed, or otherwise combined to generate a single anchor confidence score for the detected contact. In some instances, the anchor confidence score may be a numeric score, a probability, or another measure used to evaluate whether to process the detected contact as an anchor or otherwise.

The contact is classified as an anchor based on the anchor confidence score (308). For example, the anchor determination engine 130 may compare the anchor confidence score generated for the detected contact to a threshold, and may classify the contact as an anchor based on the comparison. In some implementations, the threshold may be predetermined, i.e., a set threshold, or may be dynamically determined, e.g., based on feedback information or computer learning relating to previous contacts detected by the touch-sensitive device 110. In other implementations, the contact may be classified as an anchor based on a determination by the anchor determination engine 130 that the anchor confidence score falls within a predetermined or dynamic range, that the anchor confidence score sufficiently matches an anchor confidence score for a previously classified anchor, or may otherwise be classified as an anchor based on the determined anchor confidence score.

Based on classifying the contact as an anchor, the contact is not processed as a user input at the touch-sensitive device (310). For example, based on the anchor determination engine 130 classifying the contact detected by the touch-sensitive device 110 as an anchor, the anchor determination engine 130 may determine not to process the detected contact as a user input for controlling the computing system 100. Rather, the anchor determination engine 130 may determine to ignore the detected contact, such that the user 102 may use the contact at the input area 120 of the touch-sensitive device 110 as an anchor while providing other contacts at the input area 120 as user inputs for controlling the computing system 100. Alternatively, the computing system 100 may continue to monitor characteristics of the contact to determine whether to update the classification of the contact. Having classified the contact as an anchor, the user 102 may be able to increase the precision of their intended user inputs, thereby reducing the chances of the user 102 providing erroneous user inputs by contacting an unintended area of the input area 120.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Further to the descriptions above, a user may be provided with controls allowing the user to make an election as to both if and when systems, programs or features described herein may enable collection of user information (e.g., information about a user's actions or activities, or a user's preferences), and if the user is sent content or communications from a server. In addition, certain data may be treated in one or more ways before it is stored or used, so that personally identifiable information is removed. For example, a user's identity may be treated so that no personally identifiable information can be determined for the user. Thus, the user may have control over what information is collected about the user, how that information is used, and what information is provided to the user.

Thus, particular embodiments have been described. Other embodiments are within the scope of the following claims. For example, the actions recited in the claims may be performed in a different order and still achieve desirable results.

What is claimed is:

1. A method performed by one or more computing devices, the method comprising:
    receiving, by the one or more computing devices, contact data corresponding to a contact of a set of contacts by a user detected at a touch-sensitive device;
    receiving, by the one or more computing devices, movement data from one or more movement sensors, the movement data indicating a movement of the touch-sensitive device;
    processing, by the one or more computing devices, the contact data relative to the movement data;
    determining, by the one or more computing devices and based on processing of the contact data relative to the movement data, an anchor confidence score indicative of whether the contact represents a user input made using the touch-sensitive device;
    classifying, by the one or more computing devices, the contact as an anchor based at least on the anchor confidence score; and
    based on classifying the contact as the anchor, filtering, by the one or more computing devices, the contact data corresponding to the contact with the touch-sensitive device to exclude the contact from the set of contacts processed as user inputs to the touch-sensitive device.

2. The method of claim 1,
    wherein receiving the contact data corresponding to the contact by the user detected at the touch-sensitive device comprises receiving, by the one or more computing devices, pressure data indicating a pressure of the contact detected at the touch-sensitive device during a time period, and
    wherein receiving the movement data from the one or more movement sensors comprises receiving, by the one or more computing devices, movement data indicating the movement of the touch-sensitive device during the time period.

3. The method of claim 2,
    wherein processing the contact data corresponding to the contact and the movement data comprises processing, by the one or more computing devices, the pressure data and the movement data to determine a normalized pressure of the contact during the time period; and
    wherein determining the anchor confidence score indicative of whether the contact represents a user input of the user inputs made using the touch-sensitive device, comprises determining the anchor confidence score based at least on the normalized pressure of the contact during the time period.

4. The method of claim 3,
    wherein receiving the pressure data indicating the pressure of the contact detected at the touch-sensitive device during the time period comprises receiving, by the one or more computing devices, pressure data indicating the pressure of the contact detected at the touch-sensitive device during the time period and while the touch-sensitive device is located in a vehicle,
    wherein receiving the movement data indicating the movement of the touch-sensitive device during the time period comprises receiving, by the one or more computing devices, movement data indicating an acceleration of the vehicle in a direction of vehicle motion during the time period, and
    wherein processing the pressure data and the movement data to determine the normalized pressure of the contact during the time period comprises processing, by the one or more computing devices, (i) the pressure data indicating the pressure of the contact detected at the touch-sensitive device during the time period and while the touch-sensitive device is located in the vehicle and (ii) the movement data indicating the acceleration of the vehicle in the direction of the vehicle motion during the time period to determine the normalized pressure of the contact during the time period.

5. The method of claim 1,
    wherein receiving the contact data corresponding to the contact by the user detected at the touch-sensitive device comprises receiving, by the one or more computing devices, location data indicating a location of the contact detected at the touch-sensitive device during a time period, and
    wherein receiving the movement data from the one or more movement sensors comprises receiving, by the one or more computing devices, movement data indicating the movement of the touch-sensitive device during the time period.

6. The method of claim 5, further comprising determining, by the one or more computing devices, a movement of the contact during the time period,
    wherein processing the contact data corresponding to the contact detected at the touch-sensitive device and the movement data comprises comparing, by the one or more computing devices, the movement of the contact during the time period to the movement data indicating the movement of the touch-sensitive device during the time period, and
    wherein determining the anchor confidence score indicative of whether the contact represents the user input made using the touch-sensitive device comprises determining, by the one or more computing device, the anchor score based at least on the comparison.

7. The method of claim 6,
    wherein receiving the location data indicating the location of the contact detected at the touch-sensitive device during the time period comprises receiving, by the one or more computing devices, location data indicating the location of the contact detected at the touch-sensitive device during the time period and while the touch-sensitive device is located in a vehicle,
    wherein receiving the movement data indicating the movement of the touch-sensitive device during the time period comprises receiving, by the one or more computing devices, movement data indicating an acceleration of the vehicle in a direction perpendicular to a plane aligned with the ground during the time period, and
    wherein comparing the movement of the contact during the time period with the movement data indicating the movement of the touch-sensitive device during the time period comprises comparing, by the one or more computing devices, the movement of the contact during the time period and the movement data indicating the acceleration of the vehicle in the direction perpendicular to the plane aligned with the ground during the time period.

8. A system comprising:
one or more computing devices; and
one or more computer-readable media storing instructions that, when executed by the one or more computing devices, cause the one or more computing devices to comprising:
  receive contact data corresponding to a contact of a set of contacts by a user detected at a touch-sensitive device;
  receive movement data from one or more movement sensors, the movement data indicating a movement of the touch-sensitive device;
  process the contact data relative to the movement data;
  determine, based on processing of the contact data relative to the movement data, an anchor confidence score indicative of whether the contact represents a user input made using the touch-sensitive device;
  classify the contact as an anchor based at least on the anchor confidence score; and
  based on classifying the contact as the anchor, filter the contact data corresponding to the contact with the touch-sensitive device to exclude the contact from the set of contacts processed as user inputs to the touch-sensitive device.

9. The system of claim 8, wherein the instructions, when executed by the one or more computing devices, cause the one or more computing devices to:
  receive pressure data indicating a pressure of the contact detected at the touch-sensitive device during a time period; and
  receive movement data indicating the movement of the touch-sensitive device during the time period.

10. The system of claim 9,
wherein the instructions, when executed by the one or more computing devices, cause the one or more computing devices to:
process the pressure data and the movement data to determine a normalized pressure of the contact during the time period; and
determine the anchor confidence score based at least on the normalized pressure of the contact during the time period.

11. The system of claim 10,
wherein the instructions, when executed by the one or more computing devices, cause the one or more computing devices to:
receive pressure data indicating the pressure of the contact detected at the touch-sensitive device during the time period and while the touch-sensitive device is located in a vehicle;
receive movement data indicating an acceleration of the vehicle in a direction of vehicle motion during the time period; and
process (i) the pressure data indicating the pressure of the contact detected at the touch-sensitive device during the time period and while the touch-sensitive device is located in a vehicle and (ii) the movement data indicating an acceleration of the vehicle in a direction of the vehicle's motion during the time period to determine the normalized pressure of the contact during the time period.

12. The system of claim 8,
wherein the instructions, when executed by the one or more computing devices, cause the one or more computing devices to:
receive location data indicating a location of the contact detected at the touch-sensitive device during a time period; and
receive movement data indicating the movement of the touch-sensitive device during the time period.

13. The system of claim 12, wherein the one or more computer-readable media further store instructions, that when executed by the one or more computing devices, cause the one or more computing devices to determine a movement of the contact during the time period,
wherein the instructions, when executed by the one or more computing devices, cause the one or more computing devices to:
process the movement of the contact during the time period with the movement data indicating the movement of the touch-sensitive device during the time period; and
determine the anchor score based at least on processing the movement of the contact during the time period with the movement data indicating the movement of the touch-sensitive device during the time period.

14. The system of claim 13,
wherein the instructions, when executed by the one or more computing devices, cause the one or more computing devices to:
receive location data indicating a location of the contact detected at the touch-sensitive device during the time period and while the touch-sensitive device is located in a vehicle;
receive movement data indicating an acceleration of the vehicle in a direction perpendicular to a plane aligned with the ground during the time period; and
compare the movement of the contact during the time period and the movement data indicating the acceleration of the vehicle in the direction perpendicular to the plane aligned with the ground during the time period.

15. One or more non-transitory computer-readable media storing instructions that, when executed by one or more computing devices, cause the one or more computing devices to:
  receive contact data corresponding to a contact of a set of contacts by a user detected at a touch-sensitive device;
  receive movement data from one or more movement sensors, the movement data indicating a movement of the touch-sensitive device;
  process the contact data relative to the movement data;
  determine, based on processing of the contact data relative to the movement data, an anchor confidence score indicative of whether the contact represents a user input made using the touch-sensitive device, the anchor confidence score being determined based at least on a determined correspondence of the contact detected at the touch-sensitive device and the movement of the touch-sensitive device;
  classify the contact as an anchor based at least on the anchor confidence score; and
  based on classifying the contact as an anchor, filter the contact data corresponding to the contact with the touch-sensitive device to exclude the contact from the set of contacts processed as user inputs to the touch-sensitive device.

16. The one or more non-transitory computer-readable media of claim 15, wherein the instructions, when executed by the one or more computing devices, cause the one or more computing devices to:
receive pressure data indicating a pressure of the contact detected at the touch-sensitive device during a time period; and
receive movement data indicating the movement of the touch-sensitive device during the time period.

17. The one or more non-transitory computer-readable media of claim 16, wherein the instructions, when executed by the one or more computing devices, cause the one or more computing devices to:
process the pressure data and the movement data to determine a normalized pressure of the contact during the time period; and
determine the anchor confidence score based at least on the normalized pressure of the contact during the time period.

18. The one or more non-transitory computer-readable media of claim 17, wherein the instructions, when executed by the one or more computing devices, cause the one or more computing devices to:
receive pressure data indicating the pressure of the contact detected at the touch-sensitive device during the time period and while the touch-sensitive device is located in a vehicle;
receive movement data indicating an acceleration of the vehicle in a direction of vehicle motion during the time period; and
process (i) the pressure data indicating the pressure of the contact detected at the touch-sensitive device during the time period and while the touch-sensitive device is located in a vehicle and (ii) the movement data indicating the acceleration of the vehicle in the direction of the vehicle motion during the time period to determine the normalized pressure of the contact during the time period.

19. The one or more non-transitory computer-readable media of claim 15, wherein the instructions, when executed by the one or more computing devices, cause the one or more computing devices to:
receive location data indicating a location of the contact detected at the touch-sensitive device during a time period; and
receive movement data indicating a movement of the touch-sensitive device during the time period.

20. The one or more non-transitory computer-readable media of claim 19, further comprising instructions that, when executed by the one or more computing devices, cause the one or more computing devices to determine a movement of the contact during the time period;
wherein the instructions, when executed by the one or more computing devices, cause the one or more computing devices to:
compare the movement of the contact during the time period with the movement data indicating the movement of the touch-sensitive device during the time period; and
determine the anchor score based at least on processing the movement of the contact during the time period with the movement data indicating the movement of the touch-sensitive device during the time period.

* * * * *